Sept. 1, 1953  B. GESSLER  2,650,436
MICROMETER HEIGHT GAUGE
Filed Nov. 10, 1951  2 Sheets-Sheet 2
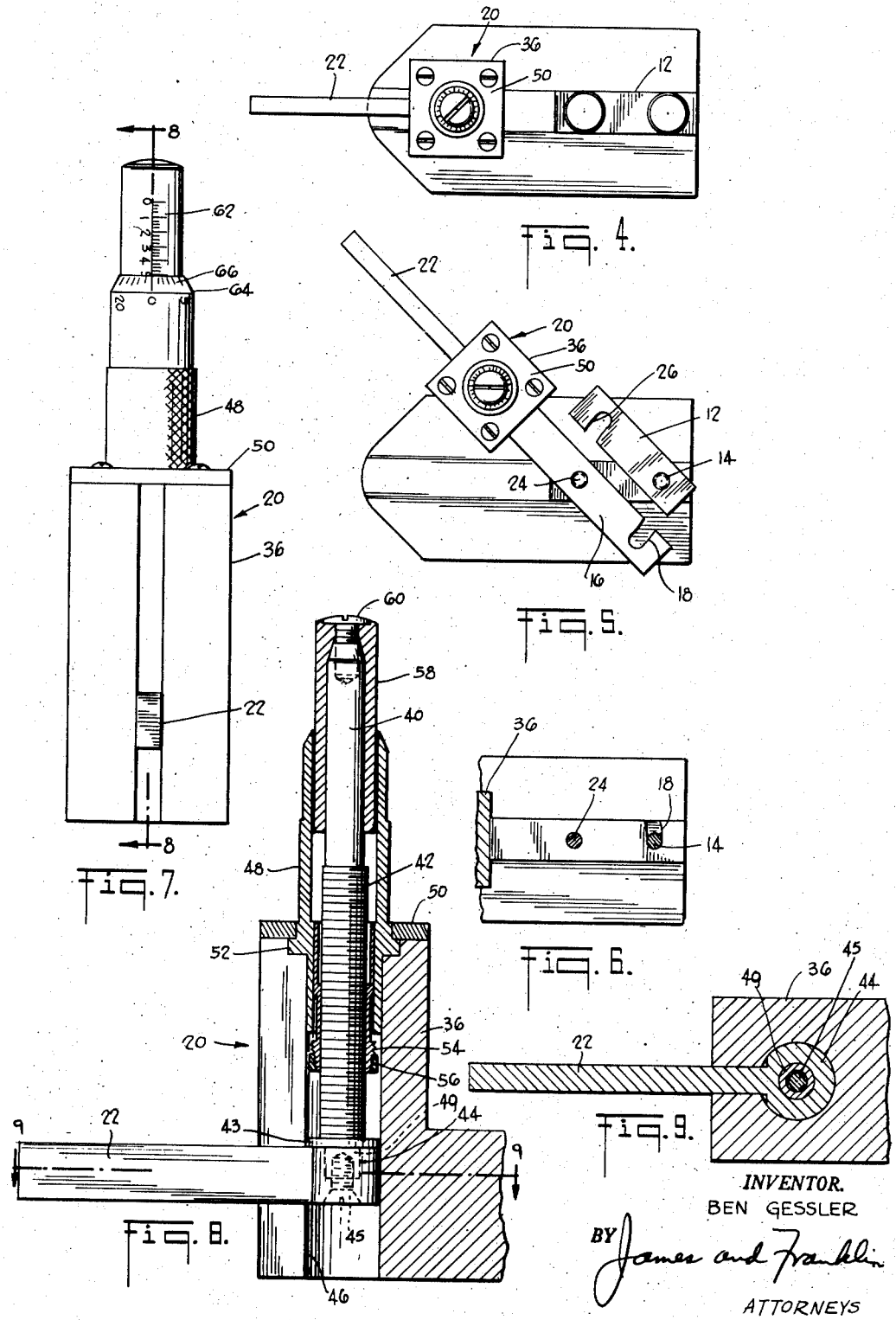
INVENTOR.
BEN GESSLER
ATTORNEYS Patented Sept. 1, 1953

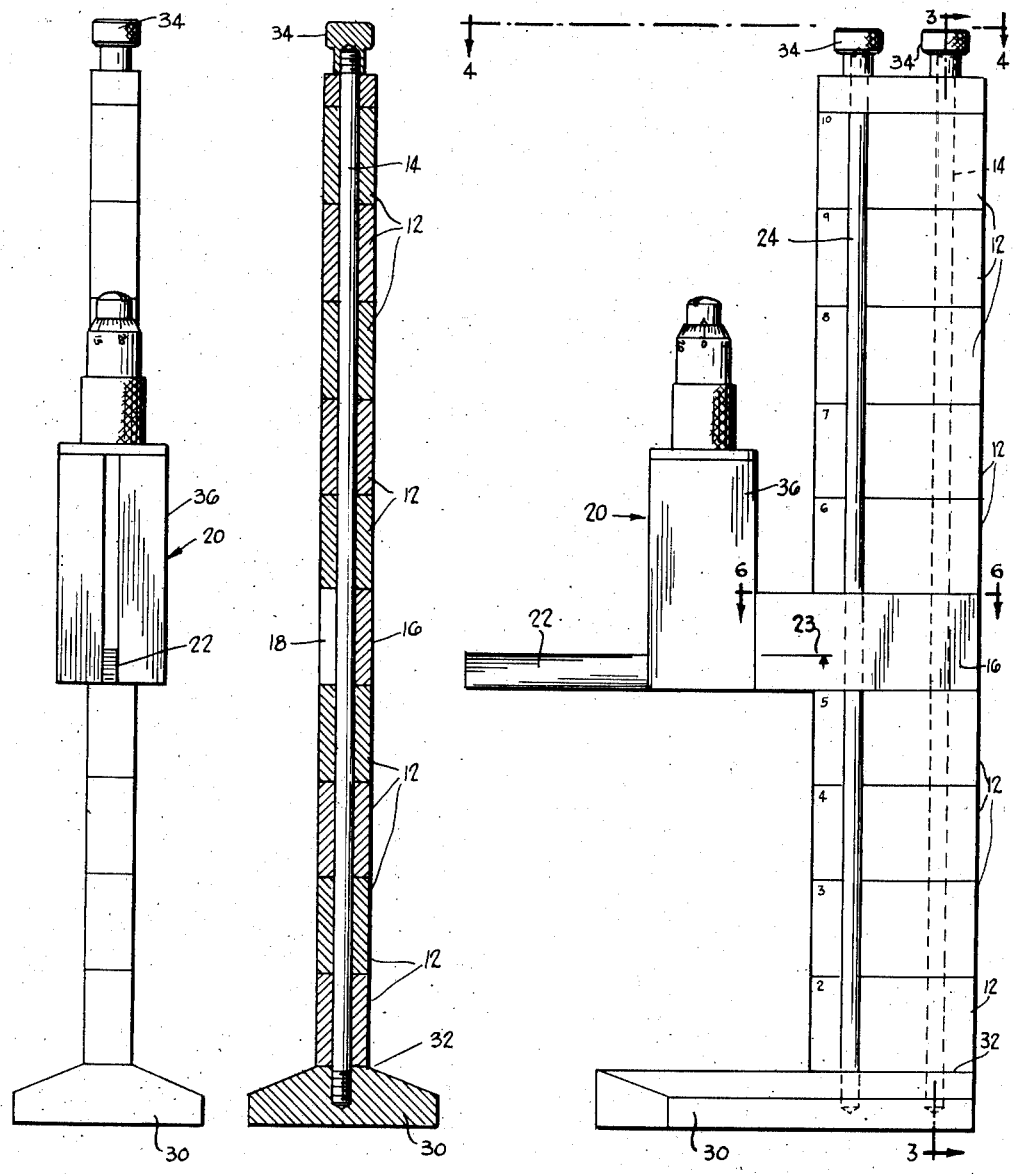

2,650,436

UNITED STATES PATENT OFFICE 2,650,436

MICROMETER HEIGHT GAUGE

Ben Gessler, Sunnyside, N. Y.

Application November 10, 1951, Serial No. 255,785

6 Claims. (Cl. 33—170)

This invention relates to height gauges, and more particularly to a micrometer height gauge.

Height gauges are already known and are commonly used in machine shop practice. The vernier types are somewhat inconvenient and difficult to read. Gauge blocks are known and are employed for highly accurate work, but they do not readily supply minute fractional amounts. It has been proposed to employ a micrometer head for greater speed, flexibility, and convenience, but such a head will provide only a limited range of motion, say one inch, and the problem then arises of establishing greater distance over a range of, say ten inches.

The general object of the present invention is to overcome the foregoing difficulties. One specific object is to provide an improved height gauge having the advantages and the accuracy of gauge blocks. An ancillary object is to provide an instrument in which the gauge blocks remain in assembled relation and thereby are protected against loss or damage. Still another object of the invention is to provide a height gauge having the speed and convenience of a micrometer head for determining fractional distances. A still further object is to combine a micrometer head and gauge blocks, thereby retaining the accuracy of the gauge blocks for large measurements, and at the same time obtaining the accuracy, speed and convenience of a micrometer head for the small or fractional measurements.

To accomplish the foregoing general objects, and other more specific objects which will hereinafter appear, my invention resides in the micrometer height gauge elements, and their relation one to another, as are hereinafter more particularly described in the following specification. The specification is accompanied by drawings, in which:

Fig. 1 is a front elevation of a micrometer height gauge embodying features of my invention;

Fig. 2 is a side elevation of the same;

Fig. 3 is a vertical section taken approximately in the plane of the line 3—3 of Fig. 2;

Fig. 4 is a plan view of the gauge;

Fig. 5 is a similar view, but showing the blocks swung sidewardly to permit elevation of the micrometer head to desired height;

Fig. 6 is a horizontal section taken in the plane of the line 6—6 of Fig. 2;

Fig. 7 is a front elevation of the micrometer head, drawn to enlarged scale, and with its finger raised from zero position;

Fig. 8 is a vertical section taken in the plane of the line 8—8 of Fig. 7; and

Fig. 9 is a horizontal section taken in the plane of the line 9—9 of Fig. 8.

Referring to the drawing, and more particularly to Fig. 2, the height gauge comprises a series of superposed gauge blocks 12 with a vertical tie rod 14 passing therethrough. There is also an elevator block 16 which is adapted to be disposed between any two of the gauge blocks. The elevator block 16 has an open-sided slot shown at 18 (Figs. 3, 5 and 6) to receive the tie rod 14 when the elevator block is disposed between any two of the gauge blocks. The gauge blocks are preferably made some standard unit in height, say one inch, and the same applies to the elevator block.

The elevator block preferably serves as a means to carry a micrometer head, generally designated 20. This has a vertical spindle and micro nut, and includes a forwardly projecting contact finger 22 with an accurately ground and lapped upper and lower face.

The elevator block 16 is preferably carried on a second rod 24 which is spaced from the first rod 14. This second rod 24 passes through the elevator block, and the two rods are so spaced or relatively located that the elevator block may be swung about the second rod 24, as shown in Fig. 5, and away from the first rod 14, to a position alongside the gauge blocks 12, so that the elevator block may be raised or lowered on the rod 24 to a desired height before being re-inserted between the appropriate two gauge blocks. For this purpose the spacing between the rods is greater than the width of the blocks, so that the blocks can pass each other when swung apart on the rods.

In preferred form both rods 14 and 24 preferably pass through all of the blocks. The gauge blocks each have a hole to receive one of the rods, in this case the rod 14, and they have an open-sided slot to receive the other rod 24. These open-sided slots are shown at 26 in Fig. 5. The elevator block 16 similarly has a hole and a slot, but in reverse position, with the hole at that end corresponding to the slots of the gauge blocks so that the blocks may be readily swung to the relative positions shown in Fig. 5, at which time the elevator block may be raised or lowered relative to the gauge blocks.

Considering the structure in greater detail, and referring to Figs. 1, 2 and 3 of the drawing, the height gauge is provided with a base 30 having a lapped and perfectly plane base adapted to cooperate with a plane work surface. This base is preferably given a thickness which is less than the height of one of the gauge blocks by an amount equal to the height of the finger 22. In the specific case shown the base has a thickness of ⅝" and the finger 22 has a height of ⅜", thus adding to 1". The reason for this is that the finger 22 is ordinarily employed with either a marker or a dial indicator (not shown) having a ground bottom surface which is rested on or clamped to the top of the finger 22. This practice need not be described in greater detail because it is the same as that used in connection with conventional vernier height gauges.

It will be understood that the top of the base is itself an accurately ground and lapped surface in order to properly receive the first gauge block. If the elevator block 16 is placed in lowermost position the height of 1" is indicated by a score line and arrow 23 (Fig. 2) which is in alignment with the top of finger 22, at which time there is a reading of zero on the micrometer scale. The line and arrow 23 are merely to remind the user that it is the top rather than the bottom of finger 22 that is to be used.

The gauge blocks 12 are highly finished precision blocks. They are held in superposed relation and thereby protected against loss or damage by the tie rods, and more particularly the tie rod 14. The tie rods are secured to the base, as by the use of threads at the lower ends, and are also threaded at their upper ends to receive knurled thumb nuts 34. These nuts are loosened slightly before shifting the elevator block, and are re-tightened after the elevator block has been shifted. However, it should be understood that the thumb nuts are not essential for accuracy, and on the contrary, the accuracy of the upright stack is based on the accuracy of the gauge blocks. As is known to those skilled in the art, such gauge blocks may be so accurately faced and perfectly lapped that the blocks adhere tightly together when placed in contact. From this viewpoint the purpose of the tie rods is simply to guard against accidental dis-assembly and possible loss of the blocks, and there is no thought that the compression of the nuts is to affect or determine the accuracy of the instrument.

The elevator block 16 is a similarly accurate block, although in this case there is need for accuracy on only the lower face, for the blocks disposed above the elevator block are idle. The elevator block 16 may be formed integrally with the housing 36 of the micrometer head. Any desired micrometer mechanism may be employed. The particular structure here shown is best illustrated in Fig. 8. The non-rotatable spindle is shown at 40, and the lower half thereof has an accurate micrometer thread 42. The spindle carries the contact finger 22, the parts being joined at a flange 43 and stud 49 accurately receiving an enlarged head 44 fixed by a screw 45 and slidable in a mating guide passage 46 in the housing block 36. The assembly is rigid for accuracy.

The micrometer is operated by rotation of a knurled thimble 48. This is held against vertical movement by a cover plate 50 bearing against a flange 52. A micrometer nut 54 has a long internal thread which is in accurate threaded relation with the micrometer screw 42. The nut 54 is fixedly and rigidly secured to the handle 48, as though integral, for rotation therewith. The friction of the fit between the male and female threads may be adjusted to eliminate play by means of a nut 56, received on a short outside thread on the micrometer nut 54. It will be understood that nut 54 is longitudinally split, and that the outside thread on which nut 56 is screwed is tapered. Detailed description is thought unnecessary because this is a known feature in the micrometer art.

The non-rotatable spindle 40 carries at its upper end a non-rotatable barrel 58 which is cured to the spindle by means of a lock screw 60. The barrel 58 carries the linear scale, best shown at 62 in Fig. 7. This may be in suitable fractions, say tenths and fortieths of an inch. The handle 48 includes a tapered portion 64 having an annular scale 66. This may have a suitable number of divisions, say twenty-five, thus providing a prompt and accurate reading to one-thousandth of an inch, and estimated reading to ten-thousandths of an inch.

In practice the non-rotatable barrel 58 may be provided with an additional scale for reading to ten-thousandths of an inch, as is now common practice and well known in the art. Although the scale 62 is shown at the front of the barrel 58 in Fig. 7, it may be mentioned that in practice it is preferably located at the side of the barrel. This is indicated in Fig. 2, but because the reading is there at zero almost nothing of the scale shows. The scale has been shown at the front in Fig. 7 only because in that figure half the scale is exposed, and it was therefore convenient for drafting purposes to show the scale there. In practice I would prefer to locate it at the side rather than at the front of the instrument.

The range of movement of the micrometer is made to at least equal the thickness of the gauge blocks, so that if one inch blocks are used the range of the micrometer should be at least one inch.

It will be understood that the lower face as well as the upper face of the finger 22 is ground and lapped so that it too may on occasion be used with a scriber or the like, as will be understood by those skilled in the art.

It is believed that the construction and method of use of my improved height gauge, as well as the advantages thereof, will be apparent from the foregoing detailed description. It will also be apparent that while I have shown the principle of my invention applied to a micrometer height gauge, some of the features, such as the movement of an elevator block relative to a confined stack of gauge blocks, are applicable to and useful with a height gauge even if not of the micrometer type. Moreover, it is not essential that the measuring instrument in which the shiftable blocks are employed be a height gauge, for the underlying idea may be applied to other measuring devices such as measuring machines, jig borers, and any machine in which accurate layout work is done. In such case the elevator block may be considered more broadly to be a movable block.

It will therefore be apparent that while I have shown and described my invention in a preferred form, changes may be made in the structure shown, without department from the scope of the invention, as sought to be defined in the following claims.

I claim:

1. A height gauge comprising a series of superposed gauge blocks, a vertical tie rod passing therethrough, a second vertical rod spaced from said first vertical rod, an elevator block adapted to be disposed between any two of the gauge blocks, said second rod passing through a hole in said elevator block, said elevator block being permanently retained by said second rod but having an open-sided slot adapted to receive the tie rod when the elevator block is disposed between two of the gauge blocks, the location of the second rod being such that the elevator block may be swung about the second rod away from the tie rod to a position alongside the stack of gauge blocks so that it may be raised or lowered on the second rod to a desired height and then re-inserted between appropriate gauge blocks.

2. A micrometer height gauge comprising a series of superposed gauge blocks, a vertical tie rod passing therethrough, a second vertical rod spaced from said first vertical rod, a micrometer head having a vertical spindle and micro nut, an elevator block on which said micrometer head is rigidly fixed, said second rod passing through a hole in said elevator block, said elevator block being permanently retained by said second rod but having an open-sided slot adapted to receive the tie rod when the elevator block is disposed between gauge blocks, the location of the second rod being such that the elevator block may be swung about the second rod away from the rod to a position alongside the stack of gauge blocks, so that it may be raised or lowered on the second rod to a desired height and then re-inserted between appropriate gauge blocks, the aforesaid rods serving to keep all of said blocks in assembled relation.

3. A gauge comprising a series of gauge blocks, a movable block adapted to be inserted between any two gauge blocks in order to establish a desired position for the movable block, two spaced tie rods passing through said locks, the space between said tie rods being greater than the width of said blocks, said gauge blocks each having a hole to receive one of the rods and an open-sided slot to receive the other rod, said movable block similarly having a hole and a slot but in reversed position with the hole at that end corresponding to the slots of the gauge blocks, whereby the position of the movable block relative to the gauge blocks may be shifted by preliminary swinging the gauge blocks about one rod away from the other rod and at the same time swinging the movable block about the latter rod and away from the first rod, so that the movable block is disposed alongside the gauge blocks and may be shifted to desired position before being re-inserted between any desired two of the gauge blocks.

4. A micrometer gauge comprising a series of gauge blocks, a micrometer head having a spindle and micro nut, a movable block on which said micrometer head is rigidly fixed, two spaced tie rods passing through said blocks, the space between said tie rods being greater than the width of said blocks, said gauge blocks each having a hole to receive one of the rods and an open-sided slot to receive the other rod, said movable block similarly having a hole and a slot but in reversed position with the hole at that end corresponding to the slots of the gauge blocks, whereby the position of the movable block relative to the gauge blocks may be shifted by preliminarily swinging the gauge blocks about one rod away from the other rod and at the same time swinging the movable block about the latter rod and away from the first rod, so that the movable block is disposed alongside the gauge blocks and may be shifted to desired position before being re-inserted between any desired two of the gauge blocks.

5. A height gauge comprising a series of gauge blocks in superposed relation, an elevator block adapted to be inserted between any two gauge blocks in order to establish a desired height for the elevator block, two spaced vertical tie rods passing through said blocks, the space between said tie rods being greater than the width of said blocks, said gauge blocks each having a hole to receive one of the rods and an open-sided slot to receive the other rod, said elevator block similarly having a hole and a slot but in reversed position with the hole at that end corresponding to the slots of the gauge blocks, whereby the position of the elevator block relative to the gauge blocks may be shifted up or down by preliminarily swinging the gauge blocks about one rod away from the other rod and at the same time swinging the elevator block about the latter rod and away from the first rod, so that the elevator block is disposed alongside the gauge blocks and may be raised or lowered to desired position before being re-inserted between any desired two of the gauge blocks, with all of the blocks in superposed relation on the two tie rods.

6. A micrometer height gauge comprising a series of gauge blocks in superposed relation, a micrometer head having a vertical spindle and micro nut, an elevator block on which said micrometer head is rigidly fixed, two spaced vertical tie rods passing through said blocks, the space between said tie rods being greater than the width of said blocks, said gauge blocks each having a hole to receive one of the rods and an open-sided slot to receive the other rod, said elevator block similarly having a hole and a slot but in reversed position with the hole at that end corresponding to the slots of the gauge blocks, whereby the position of the elevator block relative to the gauge blocks may be shifted up or down by preliminarily swinging the gauge blocks about one rod away from the other rod and at the same time swinging the elevator block about the latter rod and away from the first rod, so that the elevator block is disposed alongside the gauge blocks and may be raised or lowered to desired position before being re-inserted between any desired two of the gauge blocks, with all of the blocks in superposed relation on the two tie rods.

BEN GESSLER.

References Cited in the file of this patent

UNITED STATES PATENTS

| Number | Name | Date |
| --- | --- | --- |
| 2,516,478 | Mueller | July 25, 1950 |

FOREIGN PATENTS

| Number | Country | Date |
| --- | --- | --- |
| 510,364 | France | Jan. 22, 1920 |